United States Patent [19]

Krause

[11] 3,723,918

[45] Mar. 27, 1973

[54] SEPARATING FILTER NETWORK ACTIVE AS A QUARTZ BAND-STOP FILTER

[75] Inventor: Heinz Krause, Munich, Germany

[73] Assignee: Siemens Aktiengesellschaft, Berlin and Munich, Germany

[22] Filed: Sept. 18, 1970

[21] Appl. No.: 73,547

[30] Foreign Application Priority Data

Sept. 26, 1969 Germany ....................P 19 48 802.9

[52] U.S. Cl. ....................................333/72, 333/75

[51] Int. Cl. ............................H03h 7/14, H03h 9/00

[58] Field of Search ....................................333/72, 6

[56] References Cited

UNITED STATES PATENTS

| | | | |
|---|---|---|---|
| 3,009,120 | 11/1961 | Robson | 333/72 |
| 3,566,314 | 2/1971 | Bies | 333/72 |
| 3,017,584 | 1/1962 | Lundry | 333/6 |
| 3,560,894 | 2/1971 | Fettweis | 333/72 |
| 3,135,932 | 6/1964 | Bangert | 333/29 |
| 2,938,084 | 5/1960 | Autrey | 33/73 C |

FOREIGN PATENTS OR APPLICATIONS

| | | | |
|---|---|---|---|
| 217,842 | 12/1956 | Australia | 333/72 |
| 1,268,289 | 5/1968 | Germany | 333/72 |
| 1,142,424 | 1/1963 | Germany | 333/72 |

*Primary Examiner*—Herman Karl Saalbach
*Assistant Examiner*—Wm. H. Punter
*Attorney*—Hill, Sherman, Meroni, Gross & Simpson

[57] ABSTRACT

A network consisting of an all-pass circuit which consists of two equal frequency separating networks whose partial filters have even characteristic functions reciprocal to one another of the degree $2n$ ($n$=1, 2, 3 . . . ) and in which between each two equal partial filters there are connected four-pole circuits which are dimensioned in such a way that the electrical properties of the entire network, except for one additional phase, agree with the prescribed electrical properties of the interposed four-pole circuits. The interposed four-pole circuits are constructed with respect to their transmission properties as equal all-pass or low-pass sections of which the one lying in the band-pass or low-pass path, is rendered a band stop circuit by quartz elements.

5 Claims, 5 Drawing Figures

INVENTOR
*Heinz Krause*

BY *Hill, Sherman, Meroni, Gross & Simpson* ATTYS.

INVENTOR
Heinz Krause

BY Hill, Sherman, Meroni, Gross & Simpson ATTYS.

SEPARATING FILTER NETWORK ACTIVE AS A QUARTZ BAND-STOP FILTER

CROSS REFERENCE TO RELATED APPLICATION

This invention is related to the invention disclosed by Poschenrieder et al. in their U.S. application for patent, Ser. No. 73,879, filed Sept. 21, 1970, and assigned to the same assignee as the present invention.

BACKGROUND OF THE INVENTION

1. Field of the Invention

The application relates to a quartz band-stop filter, consisting of an all-pass circuit which consists of two equal frequency separating networks whose partial filters have even characteristic functions reciprocal to one another of the degree 2*n* (*n*=1,2,3 . . . ) and in which between each two equal partial filters there are inserted four-terminal two-port circuits which are dimensioned in such a way that the electrical properties of the entire network, except for one addition phase, agree with the electrical properties predetermined in the partial frequency ranges of the interposed four-pole circuits.

2. Description of the Prior Art

The control signals necessary for controlling and monitoring of carrier frequency systems, the so-called pilot signals, must be suppressed, as is well known, in the art, at the end of a transmission interval by narrow band stop circuits, which circuits generally contain quartz crystals. For this purpose all-pass circuits or low-pass circuits with a narrow-band quartz interference can be used, and in the case of troublesome fundamental waves or harmonics separating filter all-pass networks can be used for suppressing spurious resonances such as have become known, for example through German published application No. 1,142,424 or through German Pat. No. 1,268,289.

Since in wide-band carrier frequency systems used at present the upper transmission limit lies at about 60 MHz, band stop filters with correspondently high band stop frequencies are needed. According to the present state of technology, quartz elements with resonant frequencies above 30 MHz as fundamental tone resonators are producible only with relatively great technological expenditure. Overtone vibrators which are operated in the 3rd or 5th harmonic are, however, well realizable up to far higher frequencies. The use of such overtone vibrators in quartz band stop filters requires, in consideration of the high frequency position and of the great ratio of the static capacitance $C_p$ to the dynamic capacitance $C_q$, which then lies at a value of about 3,000, a technique deviating from the circuits hitherto known, and in particular an effective suppression of the fundamental tone as well as a capacitive transformation of the quartz impedance.

In this context, for the suppression of spurious resonances there has become known through German published application No. 1,142,424 an all-pass circuit in double-T circuit configuration which contains quartz crystals in the transverse branch of its band pass filter. The quartz crystals are decoupled from one another by resistors. With effective decoupling this leads in general to intolerable fundamental attenuations; otherwise the stop band attenuation increases only with the logarithm of the quartz number.

Further, in German Pat. No. 1,268,289 there are given arbitratily extensible quartz-disturbed all-pass circuits in which the stop band attenuation increases proportionally with the quartz number, which, however, with the requirement for extremely great $C_p/C_q$ ratios and capacitive quartz transformation, lead to inexpedient circuits not suited for high frequencies.

SUMMARY OF THE INVENTION

In the above-mentioned application of Poschenrieder et al. there is disclosed a network consisting of a separating filter all-pass circuit which consists of two equal frequency separating networks whose partial filters have even characteristic functions reciprocal to one another of the degree 2*n* (*n*=1,2,3 . . . ) and in which between each two equal partial filters there are connected four-terminal two-port circuits which are dimensioned in such a way that the electrical properties of the entire network, except for one additional phase, agree with the prescribed electrical properties of the interposed four-terminal circuits. With partial filters constructed as band pass filters or band stop filters, this problem is solved according to the invention in the manner that the interposed four- terminal circuits are constructed with respect to their transmission properties as equal all-pass or low-pass sections of which the one lying in the band-pass path is supplemented by additional quartz crystals into a band stop circuit.

In the co-pending Poschenrieder application it is already shown that it is possible to use any desired two-port circuit with a like transmission behavior without disturbance of the transmission behavior between the partial filters of two branches supplemented into an all-pass circuit. In the invention, one of these two-port circuits constructed as a quartz band stop filter is engaged between the band-pass filters of the all-pass separating circuit. There can then be branched parallel to the band-pass parallel resonant circuits crystals which are decoupled by interposed quartz-disturbed low-pass or all-pass sections and yield a blocking attenuation contribution corresponding to these sections. The dimensioning of the quartz-disturbed all-pass circuits or low-pass circuits can be carried out, for example, according to dimensioning instructions such as are given in the article by G. Bosse and H. Matthes, "Quartz Band Stops for Wide Transmission Ranges," in the periodical "NTZ", 1964, No. 10, pages 515 to 519, or in the article by Collin/Allemandou, "Filtres Coupe-Band Speciaux a Cristaux Piezoelectriques" (Special Band Stop Filters with Piezoelectric Crystals) in the journal "Cables et Transmission 16," (1962), pages 359 to 362.

BRIEF DESCRIPTION OF THE DRAWINGS

Other objects, features and advantages of the invention will be best understood from the following detailed description taken in conjunction with the accompanying drawings, in which.

DESCRIPTION OF THE PREFERRED EMBODIMENTS

Figure 1:
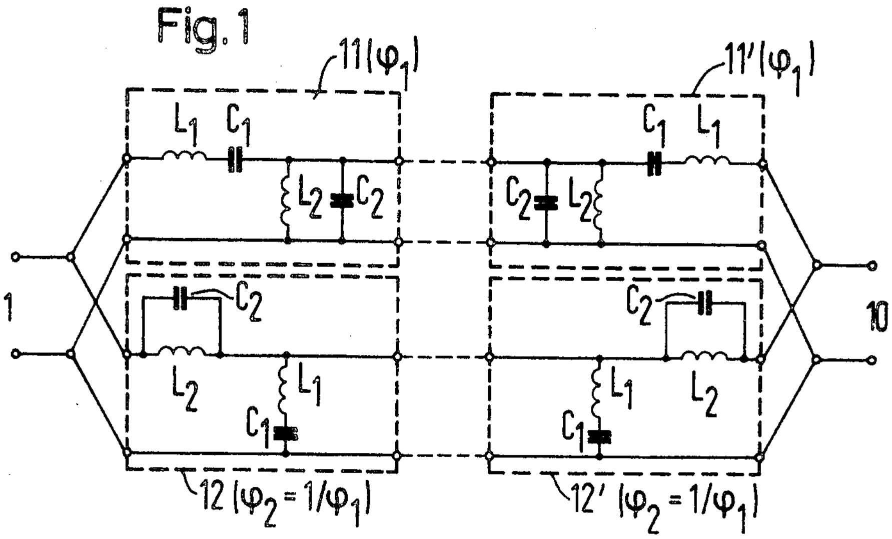
FIG. 1 is a circuit diagram of a separating filter all-pass arrangement without interposed two-port circuits.

The all-pass circuit represented in FIG. 1 consists, in corresponding utilization of the teaching according to the above Poschenrieder et al. application, of the parallel circuit of a band-pass branch and of a band-stop branch. The input terminals of the separating filter all-pass circuit are designated with the reference number 1, and its output terminals with the reference number 10. The band-stop branch consists of the partial filters 12 and 12'. The individual partial filters have even characteristic functions reciprocal to one another of the degree $2n$ ($n$=1,2,3 . . . ); i.e., therefore, partial filters 11 and 11' have the characteristic function $\phi 1$ and partial filters 12 and 12' have the characteristic function $\phi 2 = 1/\phi_1$. The individual partial filters are connected in a mirror-image arrangement, but between the individual partial filters there are also further provided two-port circuits as is shown by the broken lines. In the particular example of execution, the partial filters 11 and 11' are constructed as band pass circuits of the 4th order, so that, therefore, the partial filter 11 with its series resonant circuit of the coil $L_1$ and the capacitor $C_1$ begins in the longitudinal branch, on which there follows in the transverse branch a parallel resonant circuit with the coil $L_2$ and the capacitor $C_2$. The band pass circuit 11' is constructed in mirror-image to the band pass circuit 11. The band stop circuit 12 consists of a parallel resonant circuit with the coil $L_2$ and the capacitor $C_2$ in the longitudinal branch, upon which there follows in the transverse branch a series resonant circuit with the coil $L_1$ and the capacitor $C_1$. In mirror-image to this there is connected a band stop circuit 12'.

The elements of the all-pass circuit can be calculated, for example with establishment of suitable characteristic functions $\phi_1$ and $\phi_2 = 1/\phi_1$ according to the rules of insertion-loss theory. The elements of an all-pass circuit of 4th order, sufficing for most cases of utilization, can be explicitly stated in a simple manner, since by reason of the all-pass conditions all the resonant circuits have the same resonant frequency $\omega_\infty$ and all the parallel-circuit and series-circuit coils, respectively, have in each case equal inductances.

The middle frequency $\omega_\infty$ of the band stop circuits 12, 12' is determined by the stop band range of the quartz band-stop filters, to be explained below. For the control of the $C_p/C_q$ ratio of the transverse quartz crystals or for the control of transmission there remains as a free parameter the cutoff frequency $\omega_{g1}$ or the $\omega_{g2}$ frequency—symmetrical to $\omega_\infty$. There is provided for the circuit elements $L_1$, $C_1$, $L_2$ and $C_2$ with $\omega = 2\pi f$ as the corresponding angular frequency to the frequency $f$ the following dimensioning:

$$L_1=\frac{\sqrt{2}.Z}{\omega_\infty(f_\infty/f_{g1})-(f_{g1}/f_\infty)};\ C_1=\frac{1}{\omega_\infty{}^2L_1}$$

$$L_2=L_1\cdot[f_\infty/f_{g1})-(f_{g1}/f_\infty)]^2;\ C_2=\frac{1}{\omega_\infty{}^2L_2}$$

In the choice of $\omega_{g1}$ attention is invited that the loss attenuation which is caused by delay through excessively close approach of $\omega_{g1}$ to $\omega_\infty$ does not become too great. On the other hand, through small spacing of $\omega_{g1}$ and $\omega_\infty$ — therefore, through increase of the delay-time maxima—a great $C_p/C_q$ ratio for the crystal lying parallel to the band-pass branch, then becomes possible a high transformation ratio as well as a strong suppression of spurious resonances. In general, the distance from $\omega_{g1}$ to $\omega_\infty$ is done justice to with 20 to 40 percent with respect to both requirements.

In the embodiments of FIGS. 2 to 4 there are again illustrated the partial filters 11 and 11' and 12 and 12' framed in broken lines. The dimensioning of the circuit elements takes place according to the directions already given in connection with FIG. 1, but the section of the band-pass partial filter consisting of the circuit elements $C_1$, $L_2$ and $C_2$ (cf. FIG. 1) has been subjected to a Norton transformation, known per se, so that in the band pass branch of the circuit according to FIGS. 2 to 4 there appears a further capacitor $C_T$, which is connected in the transverse branch to the coil $L_1$ lying in the longitudinal branch. There then follows in the longitudinal branch a capacitor $C_1/$, to which there is connected in the transverse branch the parallel resonant circuit with the coil $L_2$ and the capacitor $C'_2$ or $C''_2$. The transformation takes place according to the rules or instructions known per se for the adaptation of the band-pass partial filter 11, 11' to the higher impedance level of the quartz band stop circuit VP1. The partial filters 12 and 12' remain unchanged.

Figure 2:
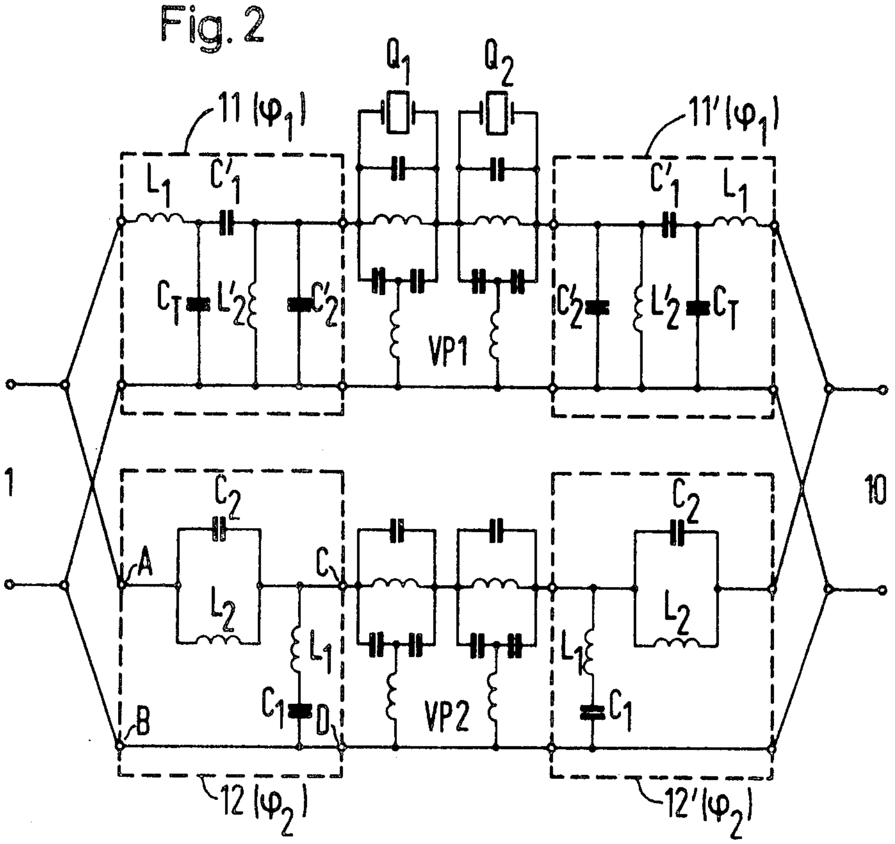
FIG. 2 is a circuit diagram of a separating filter all-pass arrangement with interconnected all-pass sections and quartz band stop sections, respectively.
Figures 3, 4, 5:
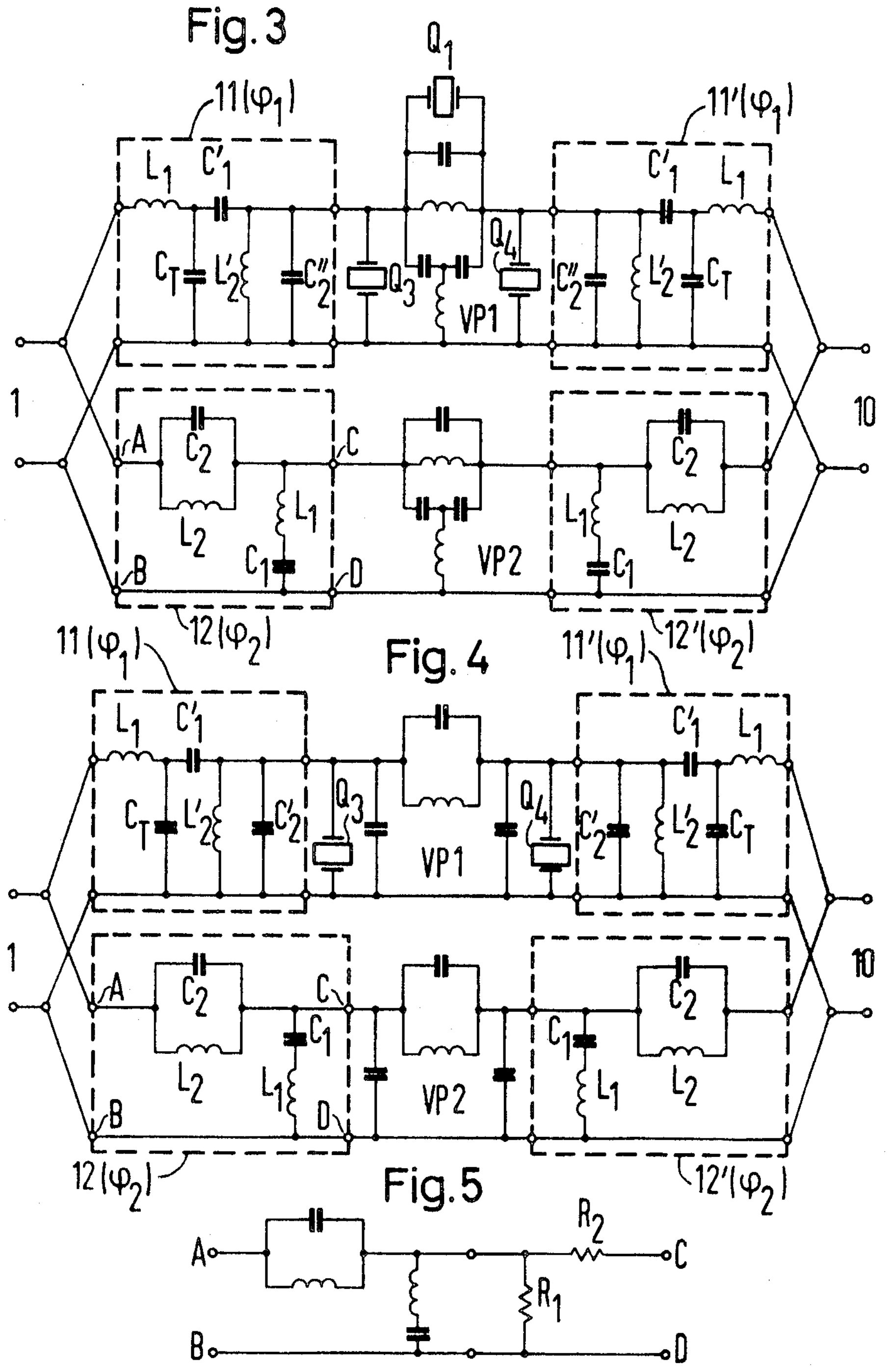
FIG. 3 is a schematic circuit diagram with additional quartz crystals in the transverse branch of a band-pass path.
FIG. 4 shows low-pass sections and quartz crystals in transverse branches of a band-pass path.
FIG. 5 shows a partial section of a circuit according to FIGS. 2 to 4 with an interposed attenuation section.

In the embodiments according to FIGS. 2 to 4 there are now connected two-port circuits between the individual partial filters, i.e., in the band-pass branch between the partial filters 11 and 11' a two-port circuit VP1 is connected and the band stop branch between the partial filters 12 and 12' a two-port circuit VP2 is connected. The two-port circuits VP1 and VP2 are constructed with respect to their transmission properties as equal all-pass or low-pass filter sections and in each case the filter section lying in the band-pass branch is supplemented by connecting of quartz crystals into a band stop section.

In the embodiment of FIG. 2, the interposed two-port circuits VP1 and VP2 consist of all-pass sections which are constructed in the form of bridged-T sections. The bridged T sections themselves consist of two capacitors in the longitudinal branches, a coil in the transverse branch and a parallel resonant circuit in the bridging branch. The all-pass sections belonging to the four-pole circuit VP1 are completed into a band stop filter by connecting of the quartz crystals $Q_1$ and $Q_2$ in the bridging branch.

In the embodiment of FIG. 3, the interposed two port circuits can be constructed as a single section according to the circuit of FIG. 2, as can be seen by a direct comparison of the two circuits. Additionally, in the circuit according to FIG. 3 in the band-pass branch 11, 11' there is engaged parallel to the parallel resonant circuit $L'_2$, $C''_2$ respective quartz crystals $Q_3$ and $Q_4$. The interposed four- terminal circuit VP1 is constructed in such a way that the quartz crystals $Q_3$ and $Q_4$ are decoupled, i.e., care is taken that the crystals $Q_3$ and $Q_4$ do not act simply as parallel-connected quartz crystals.

It is to be heeded that between each two quartz crystals following one another in the transverse branch or longitudinal branch there exists, in each case, a phase shift of 90°, if possible, or an odd multiple thereof.

In the embodiment according to FIG. 4 the interposed two port circuits VP1 and VP2 consist of a low-pass section which is formed as a $\pi$ section with capacitors in the transverse branches and a parallel resonant circuit in the longitudinal branch. In the band-pass transverse branch there are connected parallel to the transverse-parallel resonant circuits $L'_2$, $C'_2$ the quartz elements $Q_3$ and $Q_4$, and the two port circuit VP1 consisting of the low-pass $\pi$ section is constructed in such a way that the crystals $Q_3$ and $Q_4$ are decoupled by the two port circuit VP1. The two port circuit VP1 must, therefore, generate at the series resonant frequency of the quartz crystals $Q_3$ and $Q_4$ about a phase shift of $(2n-1\ \pi/2$, where $n=1,2,3\ldots$.

As already mentioned, the dimensioning of the two port circuits VP1 and VP2 can be accomplished according to rules known per se, for example according to the article already mentioned earlier of G. Bosse and H. Matthes, or according to the aforementioned article of Colin/Allemandou. Dimensioning according to the studies mentioned in the form of a quartz-disturbed all-pass or low pass circuit is independent of the dimensioning of the separating all-pass circuit. In FIGS. 2 to 4 there are shown three circuits which are equipped with two or three quartz crystals and use a quartz disturbed all-pass section with two coils respectively a quartz disturbed low-pass section with only one coil as a quartz band-stop filter. Additionally, they can be connected parallel to the input or the output or to the input and the output quartz circuits which, decoupled through the interposed two port circuits, perform a contribution to the blocking attenuation corresponding to the quartz-disturbed sections.

Attention is invited that between each two quartz circuits following one another in the transverse branch, or longitudinal branch, there exists, in each case, a phase shift of, if possible, 90° or an odd multiple thereof. In the circuits according to FIGS. 3 and 4 this phase shift is accomplished by the all-pass circuit VP1 and the low pass circuit VP1, respectively.

For the determination of the stop band attenuation in the following there is considered, with the aid of FIG. 3, a three-quartz band stop circuit, in which for better perspicuity the inductances and qualities of the transverse and longitudinal quartz elements are set equal. The series resonant frequencies of the transverse quartz elements $Q_3$, $Q_4$ and the attenuation pole of the all-pass circuit completed into the quartz stop band filter are placed on the band middle frequency $f_\infty$.

The maximal individual attenuations of the individual quartz elements $Q_3$ and $Q_4$ operated between terminal resistances, as well as of the all-pass section disturbed by the quartz element $Q_1$ are $$a_{b3} = \ln\ \left|1+Z/2R_{q3}\right|$$

$$a_{b4} = \ln\ \left|1+Z/2R_{q4}\right|$$

$$a_{b1} \approx \ln BQ - \ln 2$$

in which $R_{q3}$ and $R_{q4}$ are the series loss resistance of the transverse quartz elements $Q_3$ and $Q_4$, Q the quartz quality, $B=\Delta\omega_1/\omega_\infty$ the relative band width of the quartz-disturbed all-pass circuit and Z the terminal resistance. The total maximal attenuation $a_{bmax}$ is greater than the sum of the individual attenuations. It is provided as the attenuation of the $\pi$ section consisting of the three quartz loss resistances at $a_{bmax} \approx \ln (BQ/2) \cdot (1+Z/R_2)^2$. If the magnitude $Z/R_q$ is further expressed by $BQ$, then there is obtained the known formula $a_{bmax} \approx 3\ln BQ - \ln 2$ for three-section quartz band stop filters. There can be achieved, therefore, merely by connecting of the quartz elements $Q_3$ and $Q_4$ in the transverse branch, without additional expenditure in circuit elements, the same operating attenuation as with one of the known three-section quartz band stop filters.

In the circuits described, ground capacitances, winding capacitances and self-inductances can largely be included in the band-pass and low-pass or all-pass elements, which is likewise of advantage with high frequencies, as well, in particular, as the absence of transformer stray inductances.

The attenuation distortions caused by losses are predominantly determined by the spacing between $\omega_\infty$ and $\omega_{g1}$. Because of the large spacings in these instances of use, they are relatively small and of long wave length.

The equalizing of distortion can take place by interconnecting of a resistor attenuation section between the band stop circuit and the respective low or all-pass section of the total circuit. The image impedance of the resistor attenuation section must correspond to the terminal resistor Z. A corresponding example is shown in FIG. 5, in which there continues to be represented only the partial two port circuit identified in FIGS. 2 to 4 with the reference symbols A, B, C and D. Such an attenuating section can consist, for example, of a resistor $R_1$ in the transverse branch and another resistor $R_2$ in the longitudinal branch. The attenuation section can also be constructed with switching-in of a further resistor symmetrically and can be connected at the input and/or output side of the all-pass or low-pass circuit. The attenuation section has the attenuation of the maximally occurring attenuation distortion in the pass range. The distortion equalization is brought about by the feature that this attenuation section acts less and less toward the cut-off frequencies and thereby shows a behavior opposed to the attenuation distortion.

In the circuits indicated, the disturbing fundamental tone or harmonics (overtones) of the quartz elements fall in the stop band range of the band-pass filter and hardly disturb the pass range of the total circuit. The impedance transformation of the quartz band stop circuit takes place capacitively at the capacitors which lie in the longitudinal branches of the band-pass filter. Further advantages lie in the fact that the circuit is realizable with a great $C_p/C_q$ ratio of the quartz members, and that the attenuation distortion of the pass ranges of these circuits can, in general, be equalized by two resistors.

Many changes and modifications may be made in the invention by one skilled in the art, and it is to be understood that I intend to include within the patent warranted hereon all such changes and modifications as may reasonably and properly be included within the scope of my contribution to the art.

I claim:

1. In a separating filter network forming an all-pass circuit by connecting two similar separating filters (11, 12; 11', 12') in a mirror-image arrangement, said separating filters having filter circuits (11, 12, 11', 12') which have even characteristic functions, reciprocal to one another, of the degree $2n$ ($n = 1, 2, 3 \ldots$), the improvement therein comprising between each two similar filter circuits (11, 11'; 12, 12') respective two-port circuits (VP1, VP2) are connected having different transmission characteristics in the pass-bands of said filter circuits (11, 11'; 12, 12'), said two-port circuits (VP1, VP2) dimensioned in such a way that the transmission characteristics of the entire network (1, 10) agree with the transmission characteristics of the interposed two-port circuits (VP1, VP2) in the pass-bands of the respective filter circuits (11, 11'; 12, 12'), except for an additional phase, wherein said filter circuits (11, 11', 12, 12') are band-pass (11, 11') and band-stop (12, 12') filters respectively, and wherein said two-port circuits (VP1, VP2) with respect to their transmission characteristics are constructed as similar all pass-filters, of which the all pass-filter (VP1) connected in the band-pass branch (11, 11') include quartz elements ($Q_1$, $Q_2$) to form a band-stop filter.

2. A network according to claim 1, wherein said bandpass branch (11, 11') includes transverse parallel resonant circuits ($L'_2$, $C''_2$) and wherein in the band-pass branch two quartz elements ($Q_3$, $Q_4$) are connected in parallel to said transverse parallel resonant circuits ($L'_2$, $C''_2$) and wherein these quartz elements ($Q_3$, $Q_4$) are decoupled by said interconnected two-port circuit (VP1) which is dimensioned to provide a phase shift of $(2n - 1)\pi/2$ at the series resonant frequency of the quartz elements ($Q_3$, $Q_4$) where $n = 1, 2, 3 \ldots$.

3. A network according to claim 1, comprising in the band-stop branch (12, 12') a resistor attenuation section ($R_1$, $R_2$).

4. In a separating filter network forming an all-pass circuit by connecting two similar separating filters (11, 12; 11', 12') in a mirror-image arrangement, said separating filters having filter circuits (11, 12, 11', 12') which have even characteristic functions, reciprocal to one another, of the degree $2n$ ($n = 1, 2, 3 \ldots$), the improvement therein comprising between each two similar filter circuits (11, 11', 12, 12') respective reactance two-port circuits (VP1, VP2) are connected having identical transmission characteristics, so that the transmission characteristics of the entire network (1, 10) agree with the transmission characteristics of one of the interposed reactance two-port circuits, except for an additional phase, wherein said filter circuits (11, 11', 12, 12') are band-pass (11, 11') and band-stop (12, 12') filters respectively, and wherein the band-pass branch (11, 11') includes transverse parallel resonant circuits ($L'_2$, $C'_2$) and quartz elements ($Q_3$, $Q_4$) connected in parallel to said transverse parallel resonant circuits ($L'_2$, $C'_2$), said quartz elements ($Q_3$, $Q_4$) being decoupled by said reactance-two-port circuit which provides a phase shift of $(2n - 1)\ \pi/2$ at the series resonant frequencies of said quartz elements, where $n = 1, 2, 3 \ldots$.

5. A network according to claim 4, comprising in the band-stop branch (12, 12') a resistor attenuation section ($R_1$, $R_2$).

* * * * *